United States Patent [19]

Chikami

[11] 4,103,254
[45] Jul. 25, 1978

[54] TUNABLE FREQUENCY LASER

[76] Inventor: Leslie F. Chikami, 114-19th St., Hermosa Beach, Calif. 90254

[21] Appl. No.: 740,350

[22] Filed: Nov. 10, 1976

[51] Int. Cl.² ............................................... H01S 3/13
[52] U.S. Cl. ............................................... 331/94.5 S
[58] Field of Search ............... 331/94.5 C, 94.5 G, 331/94.5 D, 94.5 S, 94.5 T

[56] References Cited

U.S. PATENT DOCUMENTS

| | | | |
|---|---|---|---|
| 3,487,327 | 12/1969 | Clark | 331/94.5 S |
| 3,967,211 | 6/1976 | Itzkan | 331/94.5 S |

Primary Examiner—William L. Sikes

[57] ABSTRACT

A method and apparatus for stabilizing the frequency of a laser beam is provided wherein the laser beam from a laser cavity is sampled and dispersed. A pair of detectors detect any energy sharing of the laser beam at the desired output frequency with laser beams at a frequency above and below the desired frequency to produce an error signal. The error signal is fed back to the laser cavity to correct the distance between opposite ends of the cavity to adjust the wave length of the laser beam to emit amplified light at the desired frequency.

9 Claims, 2 Drawing Figures

TUNABLE FREQUENCY LASER

BACKGROUND OF THE INVENTION

The present invention relates to a laser beam frequency stabilization method and apparatus and more particularly to a system for dispersing a laser beam to generate an error signal which is used to stabilize the frequency of the laser beam.

A light beam may be amplified by stimulated emission of radiation to produce what is commonly referred to as a laser (light amplification by stimulated emission of radiation) beam. A laser beam is produced in an active gain medium which is constrained by a resonant cavity structure.

The lasing medium within the cavity is stimulated to produce light at frequencies determined by certain electronic and thermodynamic characteristics of the lasing material. The active medium is typically an excited gas, such as carbon dioxide, hydrogen fluoride, carbon monoxide, neon, helium or rhodamine dye. As the light travels through the active medium, its intensity increases to thereby provide amplified radiation. The means for exciting the medium are typically a flash lamp for ruby or yag glass, electrical discharge in a gas, electrical currents, in the case of a semi-conductive device, or a chemical reaction in the case of hydrogen fluoride.

The output frequency of the laser beam is determined by the optical length of the laser cavity. A cavity having a longitudinal length of $n1/2$ (where $n$ is an integer and $1$ is the wavelength) produces a laser beam having a wave length equal to $1$.

A laser cavity typically includes a pair of mirrors each at opposite ends of the active medium to form the resonant cavity having a length equal to $n1/2$. The radiation is reflected back and forth between the mirrors. The mirror radii, the ratio of the effective apertures of the cavity to its length and the transmission of the mirrors determine the losses which must be compensated for by the gain provided by the active medium to cause the light amplification to reach a sufficiently high level to emit radiation. When the active medium compensates sufficiently for the various losses in the structures so that the light amplification begins to emit radiation, the structure is said to be lasing. The length of the resonant cavity structure formed by the mirrors at opposite ends is therefore determinative of the wavelength of the light beam which is amplified to emit radiation.

Laser beams are frequently used for isotope separation, radar and heterodyne measurements, spectroscopic work, and communication. In order for laser beams to be used in such applications, lasers must have a stable, controllable wave length and frequency and a stable amplitude. The operation must be with a stable laser.

In normal laboratory laser oscillators, the cavity length is not constant but is perturbed by acoustic vibrations, thermal changes and other external influences. These changes occur basically at random. A number of approaches to laser frequency stabilization have been previously employed, including frequency lock to a fixed absorption line in an external gas cell, and dither stabilization to a center of a Lamb dip in the laser power tuning characteristic.

Frequency stabilized lasers using an external gas cell which provides an absorption resonance is shown in U.S. Pat. No. 3,921,099 to Abram et al. This technique, however, can only be used at frequencies where there is a suitable Stark effect and is limited in its control of tunability to a narrow frequency range.

Laser frequency control by use of the Lamb dip effect suffers a serious drawback. If a single frequency signal is swept about its center, there will be an amplitude minimum at the center of the frequency. This minimum is called the Lamb dip and the small rises in amplitude on either side of the dip are usable as directional control error signals. Such a technique can be used to lock a laser cavity to a single frequency. However, this system can be made to lose control of a preferred frequency. In the case of a gas laser, a strong electrical transient may suddenly shift the operating frequency to another frequency to which it will then be locked. Thus, the Lamb dip technique may be said to be frequency blind.

Laser stabilizing systems using multifrequency techniques are shown in U.S. Pat. Nos. 3,500,236 to George L. Clark and 3,487,327 to Peter O. Clark.

In such systems, two stable frequencies are established in a single laser cavity and an error signal is obtained in response to a variation in the change in frequencies. Such a system is difficult to implement since the cavity length is subject to severe geometric constraints. Also, since such systems must support laser beams having several frequencies, they are inefficient.

A laser frequency stabilizing device has been developed that employs variations in the position of interference patterns which result from variations in the output frequency of a laser. These interference patterns are generated by sampling a portion of a laser output and passing it through a Fabry Perot etalon, which spatially separates the light as a function of frequency. The error signal generated by detecting the spatial changes in these patterns is used to control the optical length of the cavity as shown in U.S. Pat. No. 3,967,211 to Itzkan et al. Such a device is designed for use in a dye laser for the separation of isotopes and requires an elaborate temperature control equipment associated with the etalon.

Furthermore, all of the devices described above require an excessive amount of circuitry and hardware which renders them costly and prone to failure.

SUMMARY OF THE INVENTION

The present invention relates to a system for stabilizing a laser beam to a desired frequency and wavelength. The laser beam is produced between the longitudinal ends of a laser cavity and control means is mounted into the laser cavity to adjust the longitudinal length of the cavity.

Dispersing means is provided for receiving at least a portion of the laser beam and detecting means receives the dispersed laser beam. The detecting means includes a pair of detectors with the first detector being responsive to a laser beam having a frequency which is above the desired frequency and the second detector being responsive to a laser beam having a frequency below the desired frequency. The detectors thereby produce an error signal.

The error signal is coupled, by a suitable coupling means from the detecting means to the control means to adjust the longitudinal length of the laser cavity. The laser beam is thereby stabilized to the desired frequency and wavelength.

BRIEF DESCRIPTION OF THE DRAWINGS

In the drawings which constitute a part of this specification, exemplary embodiments demonstrating various features of this invention are set forth wherein.

DESCRIPTION OF THE PREFERRED EMBODIMENTS

The present invention produces a wide range of tunability of frequencies. The pair of detectors are arrayed in such a manner as to intercept all possible frequencies produced by a given laser beam. No matter how far a transient effect drives the frequency of a laser beam above or below the desired frequency, an error correcting signal is generated to correct the cavity length to produce a laser having the desired frequency. Thus, the device is less sensitive to mechanical shock and electrical disturbances than prior art devices.

Furthermore, the wide range of tunability of the present invention provides a substantial benefit over Lamb system devices which lock a laser to a high gain line. These devices cannot distinguish between various frequencies. This tunability also provides a benefit over Stark effect systems since once the output of a Stark effect device is driven out of a narrow frequency range, there is no provision for re-establishing frequency control over the output.

The construction of the present invention is less costly than prior art devices. It does not require lock-in amplifiers, such as is required in U.S. Pat. No. 3,921,099 to Abram et al., and which cause the laser output to be frequency modulated. Furthermore, the present invention does not require cryogenically cooled detectors which are required in various prior art devices.

The present invention stabilizes the frequency of a laser beam at a desired frequency by sensing the energy of laser beams having frequencies above and below the desired frequency. The detecting is performed by a pair of detectors which produce an error signal which is fed back to the cavity to adjust the length to thereby stabilize the frequency of the laser beam to the desired frequency.

The laser beam is sampled and dispersed by a grating which reflects it to the two detectors. In one embodiment, the grating is external to the cavity and in an alternative embodiment it is positioned inside the cavity.

Figure 1:
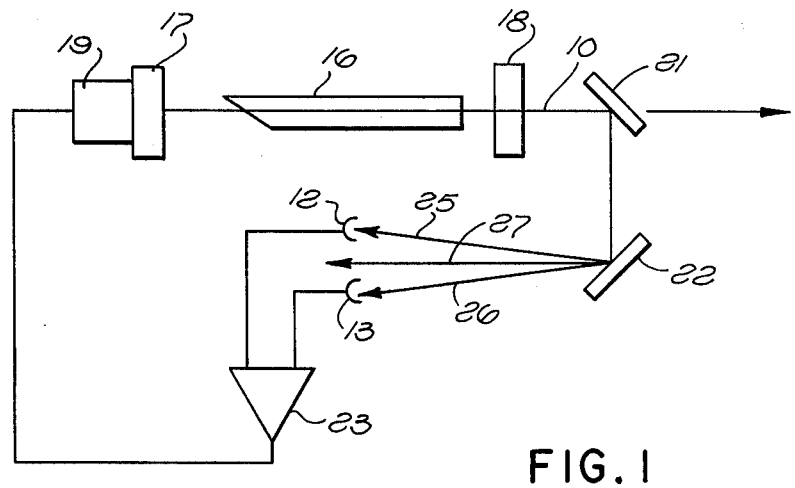
FIG. 1 is a block diagram of a first embodiment of the present invention using an external grating; and, FIG. 2 is a block diagram of a second embodiment of the present invention using an intra-cavity grating.

As is shown in FIG. 1, a laser active medium container or tube 16 and mirrors 17 and 18, which establish the length of the laser cavity, produce a laser beam 10. The mirror 18 is a coupling mirror which provides partial reflection while permitting a portion of the laser beam 10 to be transmitted through the mirror 18 out of the cavity to beam splitter 21. The beam splitter 21 may be any suitable salt, such as sodium chloride, which transmits approximately 96% of the laser beam 10 while reflecting approximately 4% of the laser beam to the external grating 22. The external grating 22 has a ruled surface and is operative to diffract wavelengths.

Thus, a lower frequency laser beam 25 is detected by detector 12 to produce an error signal and an upper frequency laser beam 26 is similarly detected by detector 13 to produce an error signal. Of course, if the total frequency of the laser beam is at the desired frequency, there will be only one beam 27 and no detection of an error signal. In this condition, the laser is producing a single desired frequency.

The pair of detectors 12 and 13, such as thermistors, detect energy within the laser beams 25 and 26 by monitoring the dispersed frequency regions both above and below the desired frequency without sensing the desired frequency. The result of any deviation of the frequency of the laser from the desired frequency detected by detectors 12 and 13 produces an error signal which is transmitted to an amplifier 23. Amplifier 23 feeds the error signal back to the control mechanism 19. This causes the control mechanism 18 to adjust the length of the cavity and correspondingly the wavelength of the laser that is produced. Since the frequency is inversely proportional to the wavelength, an adjustment of the wavelength corresponds to an adjustment of the frequency. The length of the cavity is controlled by a suitable control mechanism, such as a piezoelectricl crystal, bellows or the like.

Figure 2:
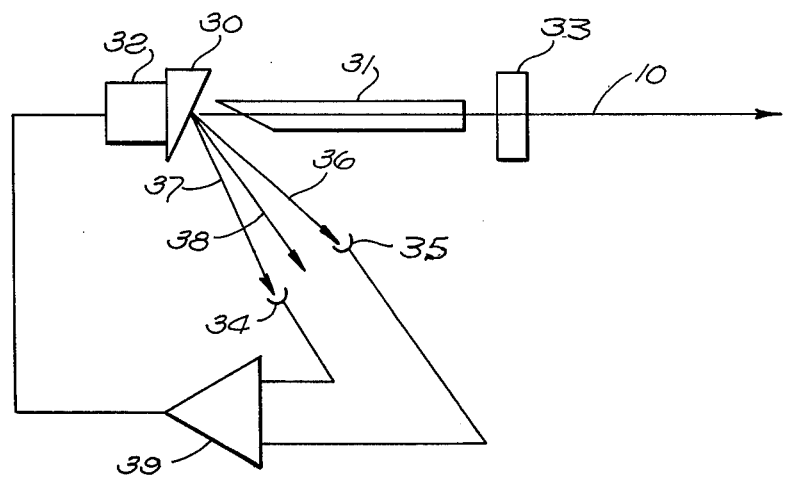

In the embodiment shown in FIG. 2, the grating 30 is one reflective end of the laser cavity and is mounted to a cavity length control mechanism 32. The laser beam 10 is transmitted through a laser tube 31 and an output coupling mirror 35.

The grating 30 reflects a small percent of the energy of the laser beam to detectors 33 and 34 which operate in a manner similar to the detectors 12 and 13 previously described. Thus, if the grating 30 transmits a laser beam having a frequency above the desired frequency, a laser beam 36 is reflected from the surface of the grating 30 and is detected by detector 33 to provide an error signal. Correspondingly, if a laser beam having a frequency below the desired frequency is produced, the surface of the grating 30 produces a laser beam 37 which is detected by the dector 34 to produce an error signal. Of course, if the laser beam produced by the cavity has only the desired frequency, only the laser beam 38 is produced which is not detected by either of the detectors 33 and 34 and therefore no error signal is produced.

The error signal is amplified by an amplifier 39 and is fed back to the cavity length control mechanism 32 to adjust the length of the cavity and correspondingly the wavelength and frequency of the laser beam to the desired frequency.

This second embodiment is particularly useful in allowing a wide range of selection of the desired wavelength due to the intracavity grating.

It is noteworthy that this invention provides minimum signal power requirements since the detectors receive no signal energy at a stabilized condition.

Thus, the laser stabilization system of this invention causes a laser beam 10 to operate at a particular desired frequency by sensing any energy devoted to undesired frequencies and producing appropriate cavity length corrections to prevent the energy losses and frequency deviations from increasing.

Stabilizing the laser beam with respect to frequency also results in amplitude stabilization since amplitude fluctuations are largely due to the drift in frequency.

Many modifications and variations of the present invention are possible in light of the above teachings. It is therefore understood that the teachings can be practiced otherwise than as specifically described, all within the scope of the invention.

What is claimed is:

1. A stabilization system for stabilizing a laser beam to a desired frequency, which laser beam is produced between the longitudinal ends of a laser cavity, comprising:

control means adapted to adjust the longitudinal length of the laser cavity;

means for dispersing at least a portion of said laser beam into separate frequency components;

means for receiving the dispersed frequency components and detecting the occurance of those components having frequencies which are above and below a desired frequency component;

means for producing an error signal in response to the detection of frequency components having frequencies which are above or below the desired frequency and, means for transmitting said error signal to said control means whereby the longitudinal length of the laser cavity is adapted to be adjusted by the control means in proportion to the error signal to stabilize the laser beam at the desired frequency.

2. The stabilization system as described in claim 1, wherein said dispersing means comprises a diffraction grating.

3. The stabilization system as described in claim 2, further comprising:

sampling means for sampling the laser beam, and wherein said grating is mounted external to the laser cavity to receive a portion of the laser beam from said sampling means.

4. The stabilization system as described in claim 2, wherein said grating comprises an end reflector of said laser cavity.

5. The stabilization system as described in claim 1, wherein said detecting means comprises a pair of detectors with the first detector being adapted to produce an error signal in response to detection of a laser beam frequency component having a frequency above the desired frequency and the second detector being adapted to produce an opposite error signal in response to the detection of a laser beam frequency component having a frequency below the desired frequency.

6. The stabilization system as described in claim 5, wherein said transmitting means comprises an amplifier coupled to said detectors for amplifying the combined error signal and transmitting said combined error signal to said control means.

7. A method of stabilizing the frequency of a laser beam produced in a laser cavity to a desired frequency, comprising the steps of:

dispersing a portion of the laser beam according to the frequencies of the beam components;

detecting the energy dispersed portions of the laser beam at frequencies above the desired frequency and below the desired frequency;

producing an error signal proportional to the difference between the detected energies; and, adjusting the longitudinal length of the laser cavity in proportion to the error signal to stabilize the output of the laser beam at the desired frequency.

8. The method of claim 7, wherein said dispersing is achieved by sampling the laser beam and reflecting the sampled laser beam to a grating external to the laser cavity to disperse the laser beam.

9. The method of claim 7 wherein said dispersing is achieved by dispersing a portion of the laser beam outwardly from the inside of the laser cavity.

* * * * *

UNITED STATES PATENT AND TRADEMARK OFFICE
CERTIFICATE OF CORRECTION

PATENT NO. : 4,103,254
DATED : July 25, 1978
INVENTOR(S) : Leslie F. Chikami

It is certified that error appears in the above—identified patent and that said Letters Patent are hereby corrected as shown below:

Column 2, line 51 - "into" should be --to--.
Column 4, line 19 - "piezoelectricl" should be --piezoelectric--.
Column 4, line 37 - "dector" should be --detector--.

Signed and Sealed this

Eleventh Day of September 1979

[SEAL]

Attest:

Attesting Officer

LUTRELLE F. PARKER
Acting Commissioner of Patents and Trademarks